United States Patent [19]

Sebring et al.

[11] 4,351,092

[45] Sep. 28, 1982

[54] METHOD OF FABRICATION OF CORELESS HOLLOW FILAMENT SEPARATORY MODULE

[75] Inventors: Robert E. Sebring, Westwood; Myron J. Coplan, Natick, both of Mass.

[73] Assignee: Albany International Corp., Menands, N.Y.

[21] Appl. No.: 52,747

[22] Filed: Jun. 28, 1979

[51] Int. Cl.³ .................... B01D 13/04; B65H 54/64
[52] U.S. Cl. .................................... 28/100; 28/290; 28/291; 210/497.1; 242/2; 242/47; 242/53
[58] Field of Search ................ 242/7.21, 53, 1, 2, 242/47, 50; 210/497.1; 29/163.5; 28/290, 291, 100; 156/161, 169, 180

[56] References Cited

U.S. PATENT DOCUMENTS

| | | | |
|---|---|---|---|
| 3,422,008 | 1/1969 | McLain | 29/163.5 F X |
| 4,045,851 | 9/1977 | Ashare et al. | 210/497.1 X |
| 4,080,915 | 3/1978 | Bompard et al. | 242/7.21 X |
| 4,105,548 | 8/1978 | Baker et al. | 210/23 H |

*Primary Examiner*—Robert Mackey
*Attorney, Agent, or Firm*—Kane, Dalsimer, Kane, Sullivan and Kurucz

[57] ABSTRACT

The method of fabricating a coreless hollow filament bundle of interlaced hollow filaments to be used as the membrane elements in a separatory module comprising the steps of providing first and second axially spaced co-axially rotatable engagement members carrying filament receiving arms, concomitantly rotating said rotatable engagement members while alternately engaging filaments upon a respective filament receiving arm of one rotary member, causing said filament to traverse the space between said first rotary member and the second rotary member and engaging said filament upon a receiving arm of said second rotary member, and continuously feeding said filament between said receiving arms of said rotary members so as to provide a coreless bundle of filaments interlacing with one another in left and right hand helices at angles to the common axis of rotation of the two rotary members.

3 Claims, 2 Drawing Figures

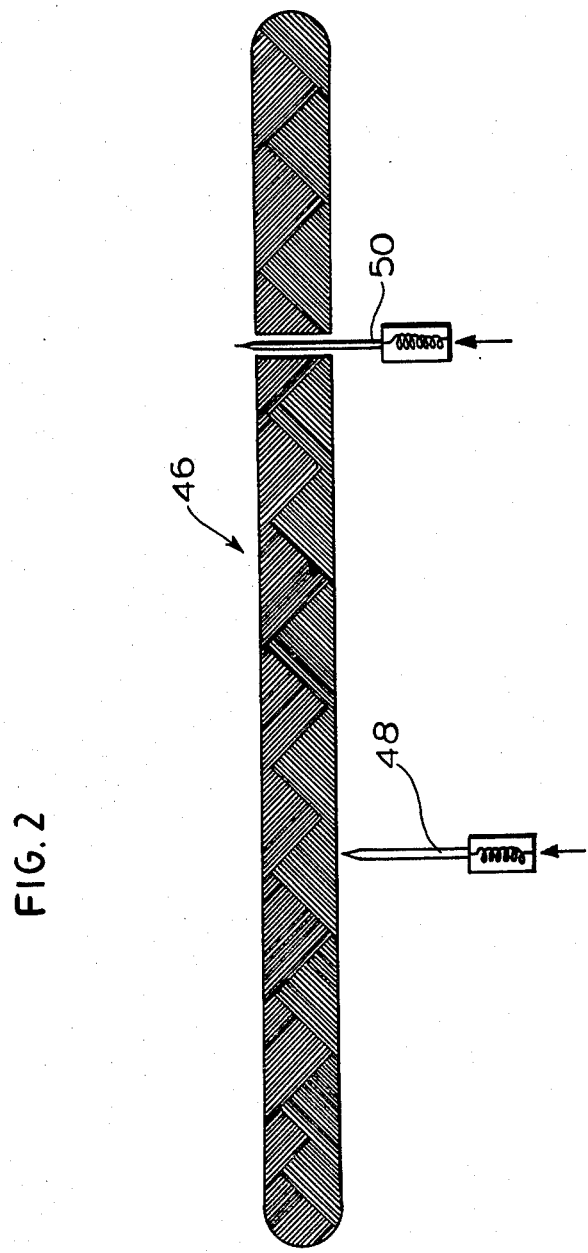

METHOD OF FABRICATION OF CORELESS HOLLOW FILAMENT SEPARATORY MODULE

BACKGROUND OF THE INVENTION

The use of hollow monofilaments in connection with reverse osmosis and other separation and purification procedures is old and well known as shown in U.S. Pat. No. 3,422,008, issued Jan. 14, 1969, to Dow Chemical Company, and as shown in report PB233,102 of the Monsanto Research Corporation, dated September, 1973, to the U.S. Department of the Interior.

Hollow filament separatory modules generally consist of a large number of hollow filaments with permeable walls arranged in a cylindrical bundle inside a pressure vessel and sealed in a potted barrier or tube sheet at one or both ends of the bundle. Ends of the filaments are exposed and sliced open at their ends outside the tube sheet to provide fluid passages from the inside of the filaments.

A variety of methods is known to prepare the filament bundle assemblage. Many of these are intricate and many involve complex steps of winding with special machinery and utilization of porous sheets which act as support members.

In a module, a properly assembled multifilament array must meet a number of specifications. Among these is a geometric arrangement which provides a fairly high packing density and which at the same time minimizes channeling of the feed fluid as it passes among the filaments. Therefore, some method of keeping filaments from packing densely in certain areas and loosely in others is desirable. In other words, packing density of the filament array should be both very uniform and in the order of about 25% to 60%, if some of the main advantages of the use of hollow filaments are to be achieved. In view of these considerations, the use of various filament assembly techniques is frequently unattractive.

A bundle of filaments assembled as a collection of parallel axially aligned filaments loses some effectiveness because there is an opportunity for the occurrence of low flow resistance axial channels between filaments at some locations, with a resulting short circuiting of the fluid flow, and an inequality of flow distribution to and through the walls of all of the individual filaments. There is also the likelihood of neighboring filaments to be pressed against each other tangentially for long lengths, thus reducing the effective surface area of each such filament.

An advantageous geometry to attain the desired result has been described in U.S. Pat. No. 4,045,,851, as comprising an annular bundle of hollow filaments wound in a plurality of layers at a selected helix angle with alternate being of opposite helix direction. Further benefits of having helical intermeshing orientation of filaments to one another is shown in U.S. Pat. No. 4,105,548, where a three-dimensional network in spiral wound structure of hollow filaments in multiple layers is described. In both these methods, however, the helical structure is achieved by winding the filaments on a mandrel, resulting thereafter in the formation of an annular bundle of filaments.

While these methods provide the relatively uniform fine pore distribution of spaces among the filaments desired, in both cases the preparation of an annular bundle tends to offset some of the desired advantages of the use of a multi-filament membrane system. First, the presence of a core element filling the region of the annular bundle tends to reduce the effective total membrane surface area attainable within the operating module of which the filaments are a part. Second, the preparation of an annular bundle by wrapping fibers helically upon a core of mandrel element inherently limits the steepness of the helix to that attainable without undue slippage restrained only by resistance due to fiber on fiber. It would be desirable to provide helically wound fibers in bundles absent a central core and at extremely steep helix angles for some applications. This can be achieved to some limited extent by methods contemplated in the cited U.S. Pat. No. 4,045,851. There nevertheless remains some residue of a hollow central region by the method described in that patent and it is therefore of advantage to pursue alternate methods to attain the desired result.

SUMMARY OF THE INVENTION

A preferred bundle geometry providing a tight winding of filaments interlaced in such a manner that there is an even distribution of interfilament voids in connected tortuous paths and evenly distributed throughout the bundle, so that the fluid flow outside the filaments will have equal access to the surfaces of all the filaments is accomplished by helically winding the filaments absent a central support such as a core or mandrel with a rapid traverse, so that they extend from one end of the bundle to the other while passing around the circumference of the bundle. Successive passes of winding turns will cross each other, with only a point contact at the crossover, and with a network of fluid passages between the filaments.

Winding is carried out in such a way that the filaments are assembled into coreless bundles. This condition is physically distinct from the prior art which describes the helical winding of bundles around mandrels or cores eg. U.S. Pat. Nos. 3,422,008; 4,045,851 and 4,105,548.

In our method we may wind fibers at some specified ratio of the axial traverse speed and the rotational velocity of two spaced co-axial rotating engagement members having spokes or pins. This ratio may be constant from the beginning of wind to the completion of the winding of the bundle.

BRIEF DESCRIPTION OF THE FIGURE

FIG. 2 is a diagrammatic illustration of the steps in the method wherein individual segments of the bundle are cut.

DESCRIPTION OF A PREFERRED EMBODIMENT

Figure 1:
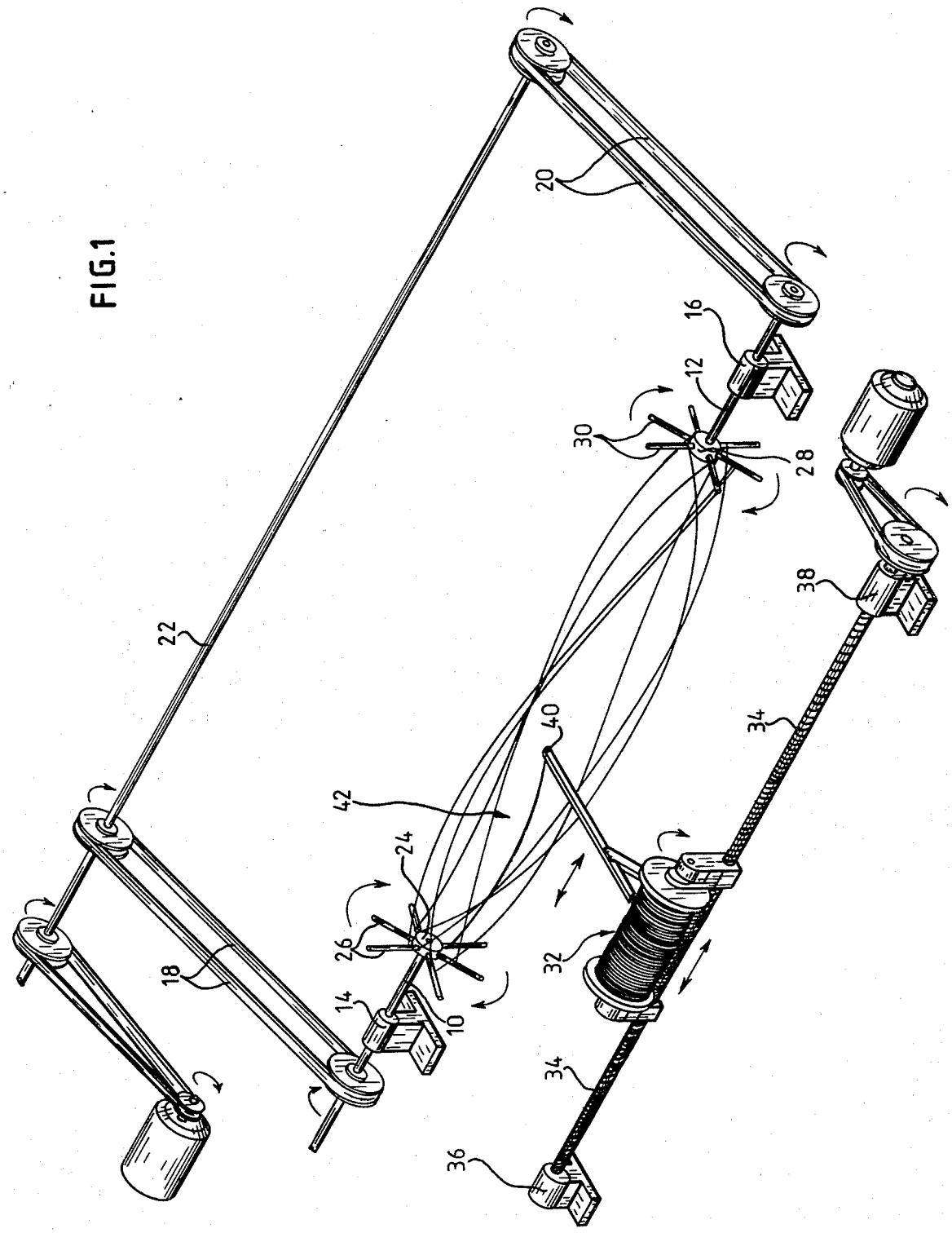
FIG. 1 is a diagrammatic illustration of the procedure for winding a bundle in accordance with the teachings of this invention.

The Figure shows the arrangement of a winding machine for practicing this invention. Shafts 10 and 12 are respectively mounted in bracket supported bearings 14 and 16 at either end of the winding machine and are rotated at the same speed by respective belts 18 and 20 from common jack shaft 22. Each stub shaft 10 and/or 12 carries a spider with radial spokes. Hence, spider 24 with radial spokes 26 is mounted on shaft 10 and spider 28 with spokes 30 is mounted on shaft 12.

Yarn supply package 32 carries a supply of hollow filamentary material, and is reciprocated back and forth on shaft 34 journaled in bearings 36 and 38 as the stub shafts are rotated. Yarn guide 40 carries the hollow filament yarn past the rotating spokes 26 and 30 alternately, so that the yarn is looped around one or more spokes at each end of the traverse. If there is a different number of spokes at either end, for example six at spider 24 and at spider 28, the winding will result in a distributed progression around the bundle being formed as indicated by the numeral 42 and a symmetrical and cylindrical ultimate bundle will result.

It has been found desirable in such a separatory bundle that all of the filaments in the bundle be of approximately the same length as between ends and this can be obtained by maintaining a constant helix angle during the course of the helical winding. It may be necessary in the production of a coreless bundle to have the first few filaments wound shorter, since they are stretched directly from pin 26 to pin 30, for example, without any previous filaments for them to be wound around. Once the winding is initiated, all succeeding layers can be made equal in length if the helix angle is maintained constant during the winding process.

There can be multiple supply packages of hollow filaments in order to shorten the time necessary to wind on the required number of turns. The winding should provide a pattern of left and right hand helices with multiple crossovers. After winding individual segments of the bundle can be cut off for potting end seals and insertion in a cylindrical chamber to provide a cartridge. This is shown in FIG. 2 wherein segments are being cut from the completed bundle 46 by cutting members 48 and 50.

We claim:

1. The method of fabricating a coreless holow filament bundle of interlaced hollow filaments to be used as the membrane elements in a separatory module comprising the steps of providing first and second axially spaced co-axially rotatable engagement members carrying filament receiving arms, concomitantly rotating said rotatable engagement members while alternately engaging filaments upon a respective filament receiving arm of one rotary member, causing said filament to traverse the space between said first rotary member and the second rotary member and engaging said filament upon a receiving arm of said second rotary member, and continuously feeding said filament between said receiving arms of said rotary membrs so as to provide a coreless bundle of filaments interlacing with one another in left and right hand helices at angles to the common axis of rotation of the two rotary members.

2. The method in accordance with claim 1 in which a constant helical angle is maintained during the course of winding.

3. The method in accordance with claim 1 in which after winding individual segments of the bundle are cut off for potting end seals.

* * * * *

UNITED STATES PATENT AND TRADEMARK OFFICE
CERTIFICATE OF CORRECTION

PATENT NO. : 4,351,092

DATED : September 28, 1982

INVENTOR(S) : Robert E. Sebring and Myron J. Coplan

It is certified that error appears in the above-identified patent and that said Letters Patent are hereby corrected as shown below:

Column 3, line 7, insert --five-- after "24 and".

Signed and Sealed this

Eighteenth Day of January 1983

[SEAL]

Attest:

GERALD J. MOSSINGHOFF

Attesting Officer — Commissioner of Patents and Trademarks